US009778720B2

(12) United States Patent
Kumar et al.

(10) Patent No.: US 9,778,720 B2
(45) Date of Patent: Oct. 3, 2017

(54) PCIE DEVICE POWER STATE CONTROL

(75) Inventors: Anil K. Kumar, Chandler, AZ (US);
John H. Crawford, Saratoga, CA (US);
Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 13/976,545

(22) PCT Filed: Dec. 30, 2011

(86) PCT No.: PCT/US2011/068096
§ 371 (c)(1),
(2), (4) Date: Jun. 12, 2014

(87) PCT Pub. No.: WO2013/101180
PCT Pub. Date: Jul. 4, 2013

(65) Prior Publication Data
US 2014/0310550 A1  Oct. 16, 2014

(51) Int. Cl.
*G06F 1/00* (2006.01)
*G06F 1/32* (2006.01)
*G06F 3/00* (2006.01)
*G06F 13/12* (2006.01)
*G06F 11/30* (2006.01)

(52) U.S. Cl.
CPC .......... *G06F 1/3206* (2013.01); *G06F 1/3203* (2013.01); *G06F 1/325* (2013.01); *G06F 1/3215* (2013.01); *G06F 1/3234* (2013.01); *G06F 11/3051* (2013.01)

(58) Field of Classification Search
CPC .. G06F 1/3206; G06F 1/3234; G06F 11/3051; G06F 1/325; G06F 1/3215
USPC ......................... 713/323, 320; 710/14, 16, 62
See application file for complete search history.

(56) References Cited

U.S. PATENT DOCUMENTS

| 5,754,869 A | 5/1998 | Holzhammer et al. |
| 5,919,264 A * | 7/1999 | Reneris .................... G06F 1/189 713/320 |
| 7,793,120 B2 * | 9/2010 | McGrane .............. G06F 1/3203 713/300 |
| 2003/0105983 A1 * | 6/2003 | Brakmo ................ G06F 1/3203 713/320 |

(Continued)

FOREIGN PATENT DOCUMENTS

TW         201037506 A        10/2010

OTHER PUBLICATIONS

"Notification Concerning Transmittal of International Preliminary Report on Patentability Chapter 1 of the Patent Cooperation Treaty", Jul. 10, 2014, for International Application No. PCT/US2011/068096, 6pgs.

(Continued)

*Primary Examiner* — Ji H Bae
(74) *Attorney, Agent, or Firm* — Hanley, Flight & Zimmerman, LLC

(57) ABSTRACT

An apparatus, system, and method, the method including receiving an indication of a idle state capability of a platform connected device; determining, by a chipset, an idle power state compatible with the device; and directing the device to enter the determined idle power state based on a power state of the chipset.

12 Claims, 3 Drawing Sheets

(56) References Cited

U.S. PATENT DOCUMENTS

| | | | |
|---|---|---|---|
| 2005/0091549 A1* | 4/2005 | Wu | G06F 1/3215 |
| | | | 713/320 |
| 2005/0235171 A1* | 10/2005 | Igari | G06F 1/3228 |
| | | | 713/323 |
| 2009/0249103 A1* | 10/2009 | Jeyaseelan | G06F 1/3203 |
| | | | 713/324 |
| 2010/0169683 A1 | 7/2010 | Wang et al. | |
| 2011/0138206 A1* | 6/2011 | Garcia-Tobin | G06F 1/3203 |
| | | | 713/322 |
| 2011/0154080 A1 | 6/2011 | Wang et al. | |
| 2011/0264938 A1 | 10/2011 | Henroid et al. | |

OTHER PUBLICATIONS

"PCT Notification of Transmittal of the International Search Report and the Written Opinion of the International Searching Authority, or the Declaration", dated Sep. 27, 2012, for International Application No. PCT/US2011/068096, 9pgs.
"English Translation of Search Report of R.O.C.", for Taiwan Patent Application No. 101147171, completed Apr. 21, 2016, 1 pg.
"Official Letter from R.O.C. with Search Report", for Taiwan Patent Application No. 101147171, mailed Apr. 27, 2016, 5 pp.

* cited by examiner

| Sub-State | DTL | Power (W) |
|---|---|---|
| D0 | 0 | 10 |
| D0i1 | 100 μs | 2 |
| D0i2 | 100 μs | 0.2 |

*FIG. 4*

PCIE DEVICE POWER STATE CONTROL

BACKGROUND OF THE INVENTION

Power management for computing platforms is a subject of great concern. It is a major focus in the design and operation of computing platforms, systems and sub-systems. Ideally, devices and components should not operate at a higher level of activity than absolutely required. However, system and devices may not, for example, be fully aware of the present and/or future operational states of the components to which they are connected. In some aspects, software embodied techniques have been proposed to manage the power states of some computing platforms. A disadvantage in some such systems is that the software must be executing in order to manage the power. Thus, the running of the software may itself prevent the system from entering into a lower idle power state.

BRIEF DESCRIPTION OF THE DRAWINGS

Aspects of the present disclosure herein are illustrated by way of example and not by way of limitation in the accompanying figures. For purposes related to simplicity and clarity of illustration rather than limitation, aspects illustrated in the figures are not necessarily drawn to scale. Further, where considered appropriate, reference labels have been repeated among the figures to indicate corresponding or analogous elements.

FIG. 4 is an illustrative depiction of a power state table, in accordance with one embodiment.

DETAILED DESCRIPTION

The disclosure herein provides numerous specific details such regarding a system for implementing various processes and operations. However, it will be appreciated by one skilled in the art(s) related hereto that embodiments of the present disclosure may be practiced without such specific details. Thus, in some instances aspects such as control mechanisms and full software instruction sequences have not been shown in detail in order not to obscure other aspects of the present disclosure. Those of ordinary skill in the art will be able to implement appropriate functionality without undue experimentation given the included descriptions herein.

References in the specification to "one embodiment", "some embodiments", "an embodiment", "an example embodiment", "an instance", "some instances" indicate that the embodiment described may include a particular feature, structure, or characteristic, but that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some embodiments herein may be implemented in hardware, firmware, software, or any combinations thereof. Embodiments may also be implemented as executable instructions stored on a machine-readable medium that may be read and executed by one or more processors. A machine-readable storage medium may include any tangible non-transitory mechanism for storing information in a form readable by a machine (e.g., a computing device). In some aspects, a machine-readable storage medium may include read only memory (ROM); random access memory (RAM); magnetic disk storage media; optical storage media; flash memory devices; and electrical and optical forms of signals. While firmware, software, routines, and instructions may be described herein as performing certain actions, it should be appreciated that such descriptions are merely for convenience and that such actions are in fact result from computing devices, processors, controllers, and other devices executing the firmware, software, routines, and instructions.

Figure 1:
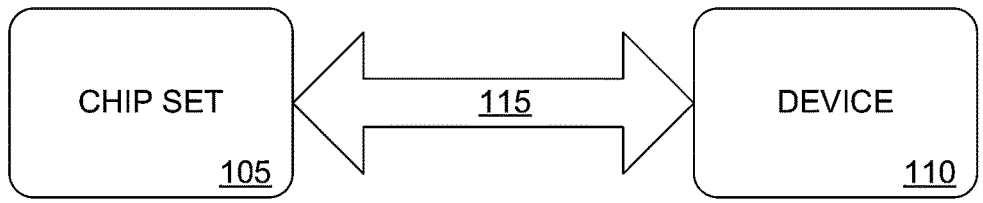
FIG. 1 is a block diagram of a system compatible with some embodiments herein.
Figure 2:
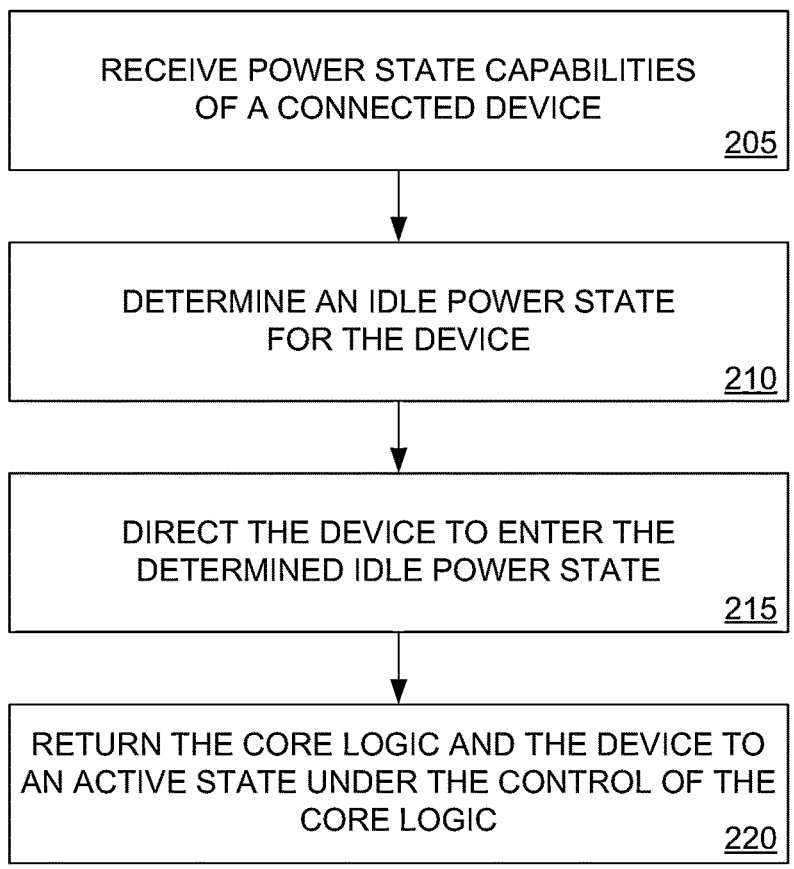
FIG. 2 is a flow diagram of a process, in accordance with an embodiment.

The present disclosure relates, in some aspects, to a control scheme or algorithm for dynamically controlling a power state of a device connected to a platform based on the power state of the platform. In some embodiments, the device may be a PCIE (Peripheral Component Interconnect Express) device connected to an end point of a PCIE bus, under the control of a core logic chipset (also referred to herein as "core logic" and "chipset"). Some embodiments herein provide a mechanism to manage the power of the PCIE device based on the power state of the platform, under the control of the chipset and within the operational constraints of the PCIE device, the chipset, and other devices, (e.g., internal and external to the chipset). FIG. 1 is a simplified block diagram of a chipset 105 interconnected with a PCIE device 110. In some embodiments, device 110 may be any endpoint connected device compatible with the bus 115 protocol. Device 110 may be one or more devices. In some embodiments, concepts and aspects of the present disclosure may be applicable to platform other than those particularly referenced, shown, or discussed herein.

Process 200 is a flow diagram of a process 200 related to one embodiment of a platform power management method, algorithm, system, and apparatus. At operation 205, a chipset (e.g., chipset 105) may receive information including the power state capabilities of a platform connected device (e.g., PCIE device 110). The power state information may be received as the result of the device advertising its power state capabilities, whether in response to a solicitation or request for such information from the chipset, the chipset requesting such information, as part of a "boot" process, etc. The power state information may be accumulated, stored, or persisted for future reference by the chipset.

At operation 210, the chipset determines an idle power state for the device. The determined idle power state may consider and be based, at least in part, on the power state information gathered by the chipset at operation 205. In some embodiments, the idle power state determined for the device at operation 210 may consider additional factors other than the device's power capabilities. In some instances, the chipset may consider, for example, operational parameters of the chipset itself as well desired performance goals.

At operation 215 the chipset may direct the connected device to enter the determined power state. In some embodiments, the device may receive an indication of the determined idle power state and enter such an idle power state at a next available opportunity. In some embodiments, the information provided to the device regarding the determined idle power state may include an indication of the power state of the chipset. Based on the power state of the chipset as reported from the chipset, the connected device may make its own state transitions with confidence knowing the state of the chipset (i.e., platform). In some embodiments, the device may enter the determined idle power state at a next idle period or at all future idle periods unless directed otherwise.

At operation 220, the core logic and the device may be returned to an active state. Operation 220 may also be managed under the control of the chipset.

In some aspects, it is noted that the control scheme and methods disclosed herein may be strictly controlled by hardware.

Figure 3:
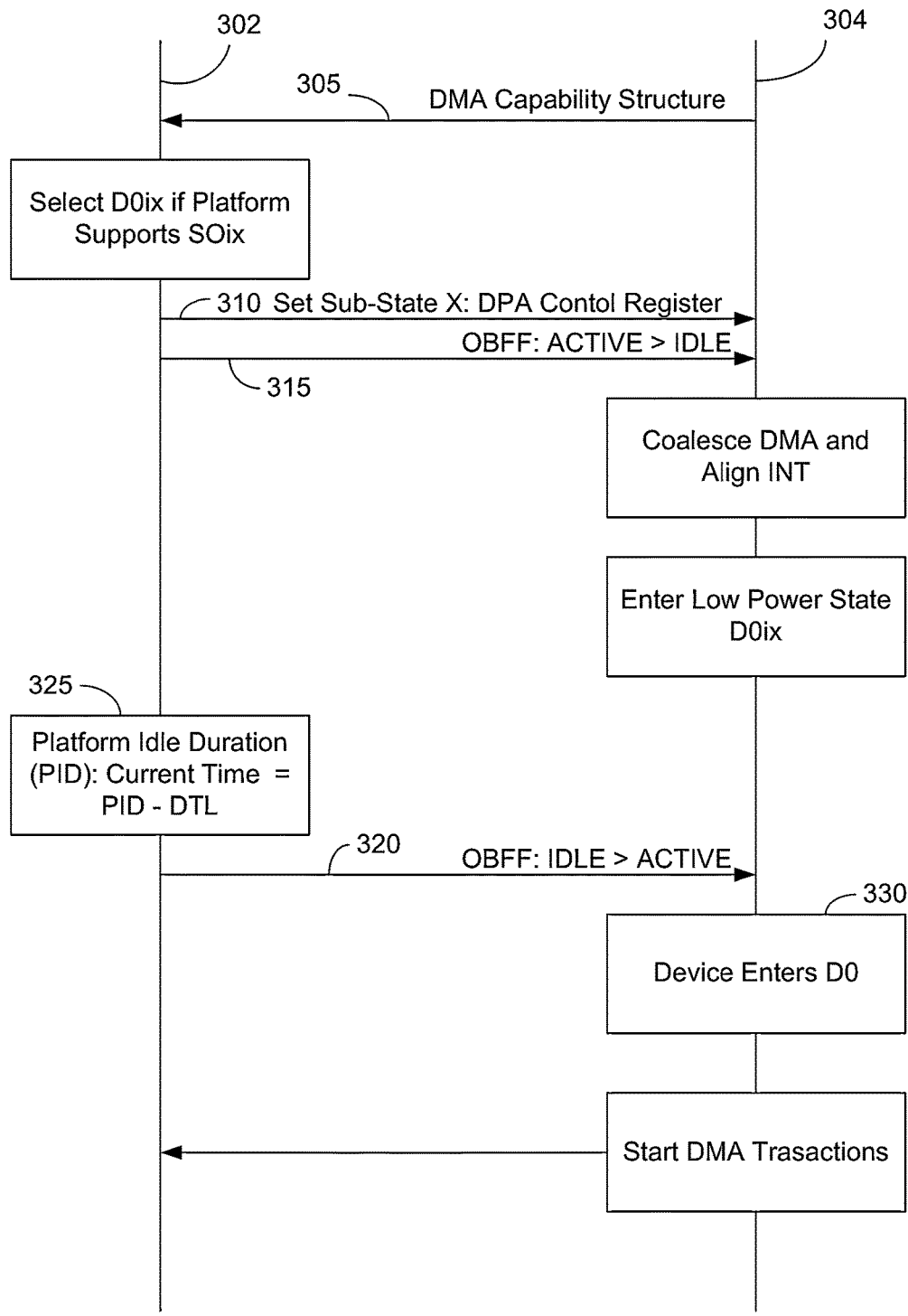
FIG. 3 is a flow diagram of a sequence of events, in accordance with one embodiment.

FIG. 3 is a flow diagram 300 of a sequence of operations occurring between a chipset at 302 and a PCIE device at 304. According to FIG. 3, the device communicates its idle state capabilities to the core logic at 305. In this instance, as provide by the DMA Capability structure of the PCIE standard. In addition to collecting or gathering the power state capabilities of the device, the chipset may receive other platform related information. The chipset may use the received information, all or parts thereof, to determine or predict how long it can expect to be idle, including expectations on exit latency. The core logic may predict how deep of an idle state it can expect to be in a next idle transition.

FIG. 4 is an illustrative example of power state information for the device connected at 304. As shown, the power state information may be captured in a table. It is noted however that any data structure may be used to contain or at least reference the device's power state parameters and values. The example of FIG. 4 details the idle states the device is capable of entering, as well as latency and power parameter values corresponding to the idle states. In this example, D0 refers to an active state and states D0i1 and D0i2 refer to a light and a deeper idle state, respectively.

Based on the gathered or accumulated device power state and platform information, the core logic can inform the connected device to enter a lighter or deeper idle state (e.g., D0i1 and D0i2) that is supported by the device. That is, the core logic may provide guidance to the device regarding the idle power state(s) it should enter based, at least in part, the state of the chipset.

At operation 310, the device is armed to enter one of the idle states that it supports, D0i1 and D0i2, upon the next idle period by a communication from the core logic. In some aspects, this guiding of the device of which idle state to enter may operate to inform the device to prepare for an idle state transition. Such preparing may involve the device "cleaning up" and concluding other operations.

At operation 315, the platform has decided that it is in or entering an idle state, defined by all cores and activity generators coalescing. A signal, for example, OBFF Active to Idle, is sent to the external device (and internal devices in some embodiments) to indicate the platform desires to enter an idle state.

At this juncture of the process, the device may know that it should coalesce the activities it is generating, and that it is safe for it (i.e., the device) to enter into the one of the idle states determined and selected by the core logic.

The platform core logic expects to be idle for a certain period of time, as illustrated at 325. In some aspects, the core logic also knows the device recovery latency from the information received from the device and stored for use/reference by the chipset.

In some aspects, the core logic may cause the system to "warm up" and activate in advance of the device exiting the idle state and (potentially) needing platform resources. In some aspects, this "warming up" operation may work to minimize software latency by not adding to it.

At operation 320, the platform informs the device that is intends to exit the idle state. The device may then enter an active state as shown at 330. Thereafter, the device may resume DMA (and other) transactions.

It is seen that the present disclosure provides a mechanism to have devices enter a low (e.g., idle) power state in an orderly and sequenced manner. As illustrated by the foregoing discussion, a process in accordance herewith may include the selection of idle states for the device based, at least in part, on the device recovery latency.

In some embodiments, the operations and processes herein are implemented in hardware. This is in contrast to OS and other software directed means. The present disclosure may also be contrasted with link state power management protocols where a physical connection or link between end points is used, as opposed to the present disclosure that directly manages and controls the operation of the core logic and the device(s). In some aspects, the power management scheme herein is independent of a communication link state status.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method, the method comprising:
receiving, by a chipset, an indication of an idle state capability of a device connected to a platform, a power state of the platform being controlled by the chipset;
determining, by the chipset, an idle power state compatible with the device, the determining of the idle power state compatible with the device being based, at least in part, on a latency of the device and the received indication of the idle state capability of the device;
directing, by the chipset, the device to enter the determined idle power state;
transitioning, the device, to the determined idle power state based on, in part, a power state of the chipset as reported from the chipset; and
exiting the platform, by the chipset, from an idle state prior to the device exiting the determined idle power state.

2. The method of claim 1, wherein the indication of an idle state capability of the platform connected device includes information regarding at least one idle state and a corresponding latency and a power consumption associated therewith.

3. The method of claim 1, wherein the received information is stored for a future reference by the chipset.

4. The method of claim 1, wherein information indicative of the latency is received from the device.

5. The method of claim 1, wherein the determining of the idle power state compatible with the device is based, at least in part, on a state of the chipset.

6. The method of claim 1, further comprising receiving an indication of at least one platform parameter value and further determining the idle power state compatible with the device based, at least in part, on the at least one received platform parameter value.

7. A non-transitory medium having processor-executable instructions stored thereon, the medium comprising:
   instructions to receive, by a chipset, an indication of an idle state capability of a device connected to a platform;
   instructions to determine an idle power state compatible with the device, the determining of the idle power state compatible with the device being based, at least in part, on a latency of the device and the received indication of the idle state capability of the device;
   instructions to direct the device to enter the determined idle power state;
   instructions to transition the device to the determined idle power state based on, in part, a power state of the chipset as reported from the chipset; and
   instructions to exit the platform from an idle state prior to the device exiting the determined idle power state.

8. The medium of claim 7, wherein the indication of an idle state capability of the platform connected device includes information regarding at least one idle state and a corresponding latency and a power consumption associated therewith.

9. The medium of claim 7, wherein the received information is stored for a future reference by the chipset.

10. The medium of claim 7, wherein information indicative of the latency is received from the device.

11. The medium of claim 7, wherein the determining of the idle power state compatible with the device is based, at least in part, on a state of the chipset.

12. The medium of claim 7, further comprising:
   instructions to receive an indication of at least one platform parameter value; and
   instructions to determine the idle power state compatible with the device based, at least in part, on the at least one received platform parameter value.

* * * * *